US005655663A

United States Patent [19]

Spradlin

[11] Patent Number: 5,655,663

[45] Date of Patent: Aug. 12, 1997

[54] SELF-SEPARATING FLATWARE AND METHOD FOR SORTING SAME

[76] Inventor: Lyndon D. Spradlin, 9N176 Rte. 59, Elgin, Ill. 60120

[21] Appl. No.: 498,680

[22] Filed: Jul. 3, 1995

[51] Int. Cl.[6] .............................. B03D 1/00; A47J 43/28

[52] U.S. Cl. ....................... 209/172.5; 209/173; 209/926; 30/147; 30/340

[58] Field of Search .................................... 209/155, 172, 209/172.5, 173, 208, 926; 30/142, 147, 322–328, 340, 342

[56] References Cited

U.S. PATENT DOCUMENTS

| | | | |
|---|---|---|---|
| 1,069,143 | 8/1913 | Keene | 209/173 |
| 1,386,956 | 8/1921 | Sanders | 30/342 |
| 3,331,507 | 7/1967 | Bossung | 209/926 X |
| 3,483,877 | 12/1969 | Naslund | 209/926 X |
| 3,738,465 | 6/1973 | Ettlinger et al. | 209/926 X |
| 3,998,728 | 12/1976 | Strauss | 209/173 X |
| 4,119,533 | 10/1978 | Saitoh et al. | 209/155 |
| 4,719,063 | 1/1988 | White | 30/340 X |
| 4,759,841 | 7/1988 | Flodin | 209/173 X |
| 5,117,928 | 6/1992 | Weihe | 209/926 X |

FOREIGN PATENT DOCUMENTS

| | | | |
|---|---|---|---|
| 2547474 | 5/1977 | Germany | 209/926 |
| 639310 | 2/1994 | Japan | 209/173 |

*Primary Examiner*—William E. Terrell
*Assistant Examiner*—Tuan Nguyen
*Attorney, Agent, or Firm*—Charles F. Meroni, Jr.

[57] ABSTRACT

Flatware that can be quickly and easily sorted when placed in a liquid solution, the flatware includes spoons, forks and knives. The spoons have a generally uniform buoyancy so as to float at a first level in the liquid solution, the forks have a generally uniform buoyancy so as to float at a second level in the liquid solution, and the knives have a generally uniform buoyancy so as to float at a third level in the liquid solution. The flatware floats at different levels in the liquid solution which provides the separation of the spoons, forks and knives in the liquid solution and enables the retrieval of the separated flatware in a sorted fashion.

19 Claims, 2 Drawing Sheets

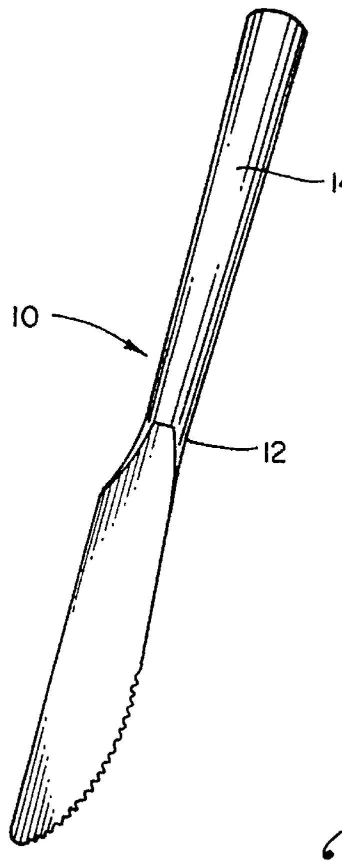
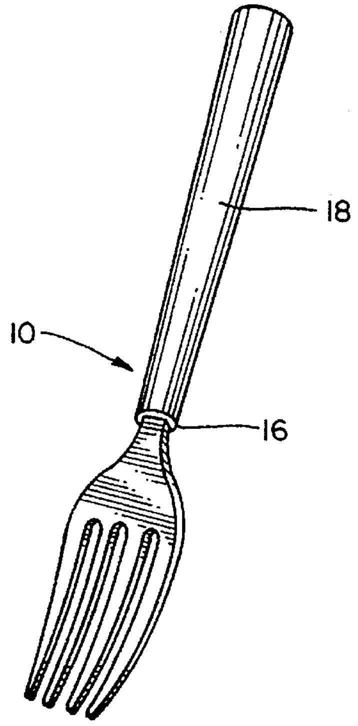
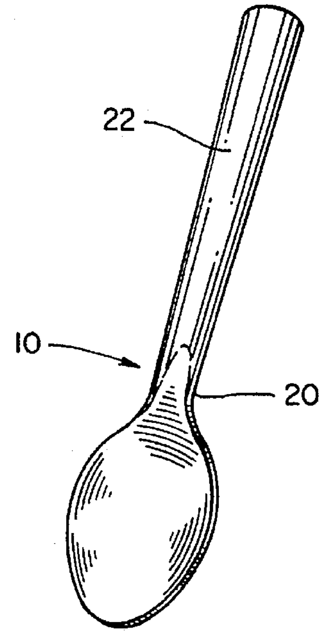
Fig. 3
Fig. 2
Fig. 1
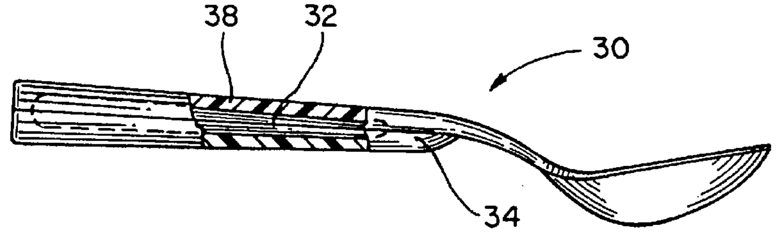
Fig. 4
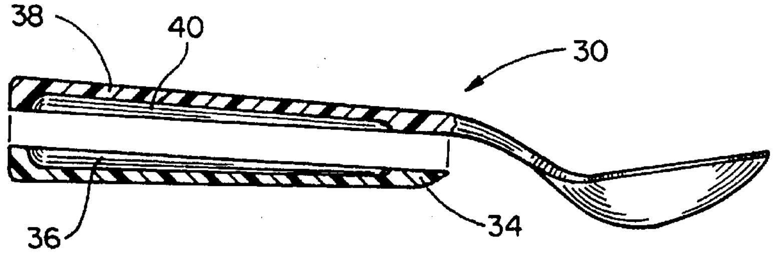
Fig. 5

SELF-SEPARATING FLATWARE AND METHOD FOR SORTING SAME

BACKGROUND OF THE INVENTION

The present invention relates generally to low cost buoyant flatware, such as spoons, forks and knives, that can be quickly and easily sorted without spending the time to manually sort the flatware by hand. Cafeterias in governmental institutions, mental hospitals, mental health schools, offices and the like typically provide flatware for use with the meals that are served. The flatware is typically reusable since it can be expensive to constantly provide disposable flatware. Prior to this invention, after the flatware is used, the flatware is then typically washed and then sorted into containers for re-use. The sorting of the flatware in governmental institutions now commonly includes the hand labor of separating the spoons, forks and knives into containers and also orienting the flatware in one uniform direction. In a cafeteria where numerous meals are served, the sorting of the flatware can be very time consuming, especially if hundreds or thousands of meals are served on a daily basis. Some cafeterias may have flatware sorting machines, however, these machines can be very costly and are not always very reliable.

Using the buoyant flatware of the present invention involves placing the flatware in a tank containing a liquid solution such as water or soapy water. The flatware will then separate in the liquid solution and can then be removed in a sorted fashion without having to separate the flatware by hand or to have an expensive machine to separate the flatware. The flatware of the present invention can improve or eliminate mechanical sorting and can greatly improve the time of manually sorting the flatware. The sorting of the flatware can take place before or after washing the flatware.

The flatware sorting techniques disclosed in the prior art do not offer the flexibility and inventive features of my floating and quick sorting flatware. As will be described in greater detail hereinafter, the floating flatware of the present invention differs from those previously proposed.

SUMMARY OF THE INVENTION

According to my present invention I have provided flatware that can be quickly and easily sorted when placed in a liquid solution, the flatware comprises three classes, each of said three classes comprises spoons, forks and knives, the spoons have a generally uniform buoyancy so as to float at a first level in the liquid solution, the forks have a generally uniform buoyancy so as to float at a second level in the liquid solution, and the knives have a generally uniform buoyancy so as to float at a third level in the liquid solution, which thereby provides separation of the spoons, forks and knives in three different levels in the liquid solution and enables the retrieval of the separated flatware in a sorted fashion.

Another feature of my invention relates to the flatware described above, wherein the flatware has handles that are buoyant and the flatware further floats in a vertical position in the liquid solution, which thereby enables the handles of the flatware to be sorted in one uniform direction.

Still another feature of my invention concerns the flatware described above, wherein one class of the flatware floats at a top surface portion in the liquid solution, a second class of the flatware floats at a bottom portion in the liquid solution in such a manner so that the second class of flatware stands on one end in a vertical position, and a third class of the flatware lies flat at a bottom portion in the liquid solution.

According to important features of my invention I have also provided floating flatware as described above, wherein a prescribed amount of salt is mixed into liquid solution, the salt acts to change the specific gravity in the liquid solution, the prescribed mount of salt is sufficient to enable the second class of the flatware to float from a bottom portion in the liquid solution to a top surface portion in the liquid solution and also is sufficient to enable the third class of the flatware to stand on one end in a vertical position at a bottom portion in the liquid solution, which thereby enables the handles of the flatware to be sorted in one uniform direction.

Yet another feature of my invention I have provided a method of sorting flatware in a liquid solution, the flatware comprises three classes, each of the three classes comprises spoons, forks and knives, each of the three classes further have a varying buoyancy so as to float at three different levels in the liquid solution, the method comprising: placing the flatware in a liquid solution; removing a first class of the flatware at a first level in the liquid solution; removing a second class of the flatware at a second level in the liquid solution; and removing a third class of the flatware at a third level in the liquid solution.

Other objects, features and advantages of my invention will become more readily apparent upon reference to the following description when taken in conjunction with the accompanying drawings, which drawings illustrate several embodiments of my invention.

DESCRIPTION OF THE DRAWINGS

FIG. 1 is a perspective view of a knife having a buoyant handle;

FIG. 2 is a perspective view of a fork having a buoyant handle;

FIG. 3 is a perspective view of a spoon having a buoyant handle;

FIG. 4 is a partial cross-sectional view of a spoon having a hollow handle embodying important features of my invention;

FIG. 5 is an exploded longitudinal view of a spoon embodying further features of my invention;

DETAILED DESCRIPTION OF THE PREFERRED EMBODIMENT

Figure 6:
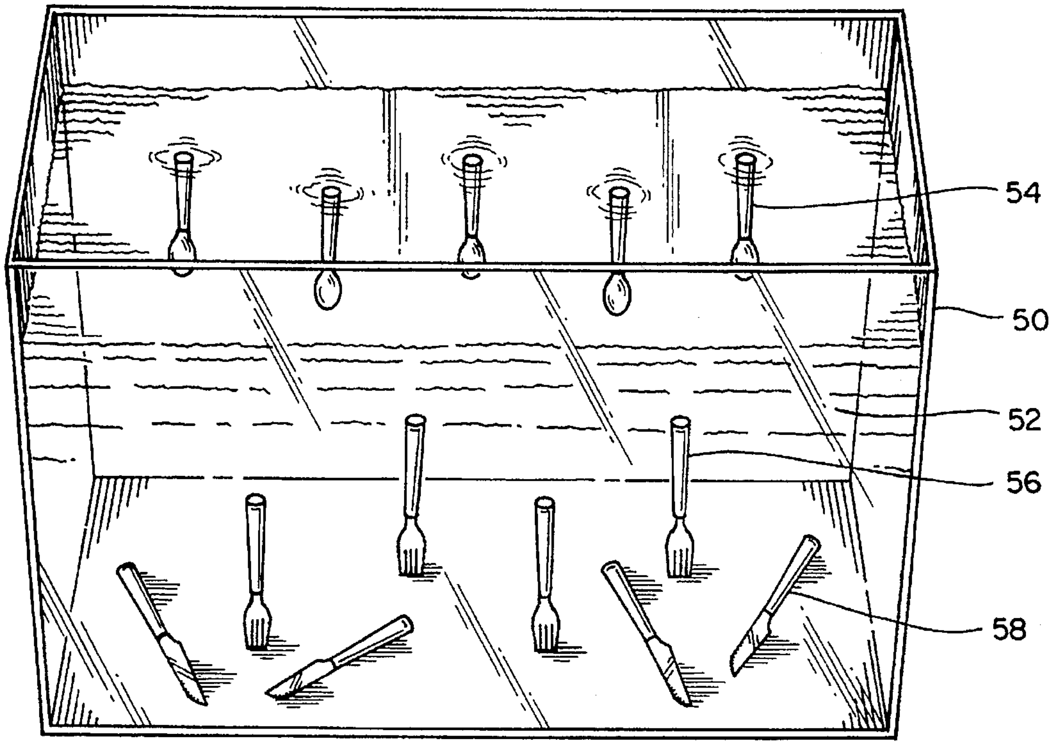
FIG. 6 is a perspective view of my buoyant flatware in a tank containing a liquid solution showing how my flatware is separated.

Referring now to the drawings, FIGS. 1–3 show my new and improved pieces of flatware 10. The flatware 10 consists of a knife 12 having a buoyant handle 14; a fork 16 having a buoyant handle 18; and a spoon 20 having a buoyant handle 22. The flatware 10 is designed and constructed in such a manner so that each class of flatware will float or sink at different levels when placed in a liquid solution such as water. For example, the spoons 20 would be designed to float at an upper level in the water, the forks 16 would be designed to stand on end at a bottom level in the water and the knives 12 would be designed to sink to the bottom and lie flat at the bottom surface in the water.

FIGS. 4 & 5 illustrate one of many methods of constructing my separating flatware. The flatware 30 can be constructed by sealing an air pocket 32 within the handle. This can be accomplished by securing and sealing a handle cover 34 having an indented hollow portion 36 at one end thereof to the handle 38 of the flatware 30 with a waterproof adhesive. The handle 38 of the flatware can additionally have an indented hollow portion 40 to provide additional buoyancy in the flatware. The handle cover 34 is secured to the handle 38 of the flatware in such a manner that the hollow portions 36, 40 adjoin each other and are sealed inside the handle of the flatware, thereby creating a sealed air pocket 32. Each class of flatware may require a larger or smaller air pocket. For example, if the spoons were designed to float at a top portion in the liquid solution, then the spoons would have the most buoyant handle. If the forks were designed to stand on end at a bottom portion in the liquid solution, then the forks would have a less buoyant handle than the spoons. If the knives were designed to lie flat at the bottom portion in the liquid solution, then the knives would be have the least buoyant or non-buoyant handle.

Excellent results can be obtained if the flatware is made of plastic and weighing in the range of 0.4 to 0.7 ounces, however other suitable materials could also be used such as synthetic plastics, wood and metal. The construction of the flatware may have to be modified to provide a more buoyant handle if metal flatware is used or less buoyant if a light plastic is used. It is contemplated that the use of plastic flatware can be used in institutions, correctional facilities, prisons and the like since metal flatware could be more easily used as a dangerous weapon.

FIG. 6 further illustrates how my flatware is separated in a container 50 of a liquid solution 52, such as a sink filled with water. The spoons 54 are all designed to float in a vertical position at a top portion in the liquid solution with the handles pointed up. The forks 56 are designed to stand on end at a bottom portion in the liquid solution, and the knives 58 are designed to lay flat on the bottom of the container. The spoons 54 can then be easily removed at the same time without removing any forks 56 or knives 58. After the spoons are removed, the forks can then be removed by grabbing their handles. The removal of the spoons 54 and forks 56 provides sorting of the flatware and orientation of the flatware in one uniform direction with the handles being oriented on one side. Excellent results are obtained when the flatware is designed to float in the manner described above, however, each class of flatware, such as the spoons, can be designed to float at any level in the liquid solution.

Figure 7:
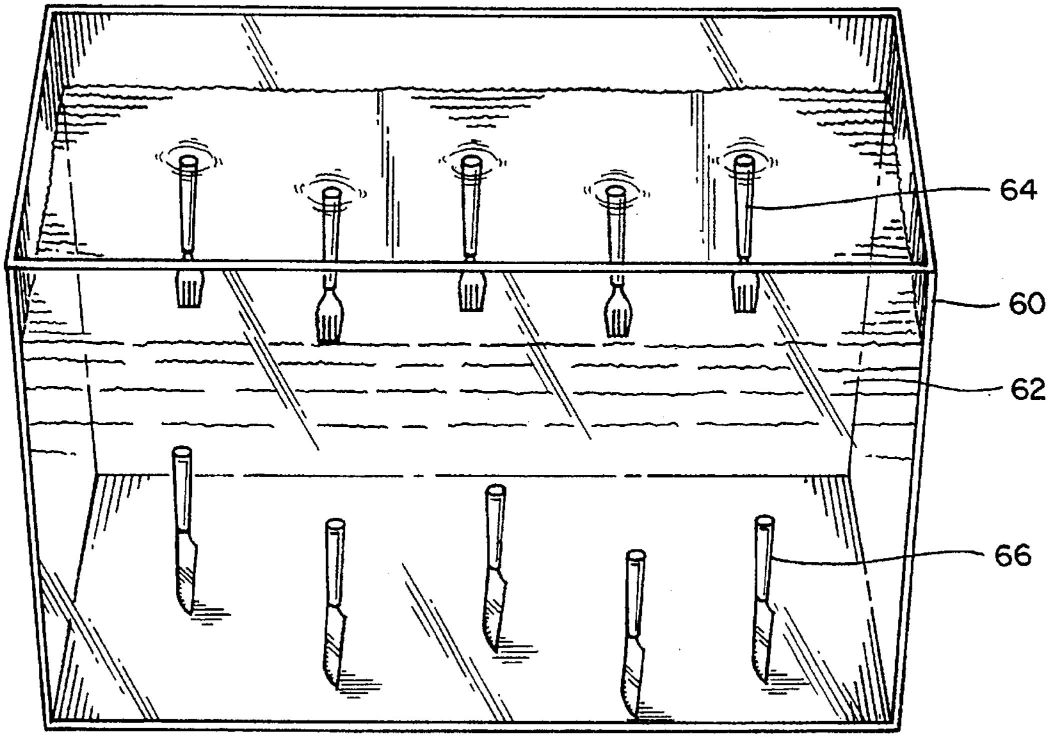
FIG. 7 is a perspective view of my buoyant flatware in a tank containing a modified type of liquid solution showing how my flatware is further separated and oriented.

FIG. 7 illustrates how my flatware can be sorted in a modified way so that all three classes of flatware can be separated and sorted in one uniform direction so that the handles will be on one side. After the spoons are removed from the container 60 of liquid solution 62, a prescribed amount of salt or a salt solution can be added to the liquid solution 62 thereby changing the specific gravity of the liquid solution and making the liquid solution more dense. Excellent results can be obtained by adding 10 to 30 grams of salt per each gallon of the liquid solution while using plastic flatware that weighs approximately 0.4 to 0.7 ounces. Since the addition of salt makes the liquid solution more dense, the best results are obtained when 30 grams of salt per gallon are added to the liquid solution. This would then enable the forks 64 to float at a top portion in the liquid solution and would then enable the knives 66 to stand on end. The forks could then be removed with the handles being oriented in one uniform direction without accidentally picking up any knives. After the forks are removed, the knives could also then be removed with the handles being oriented in one uniform direction.

The removal of the flatware from the liquid solution can be done manually or mechanically with a machine. It is contemplated that the flatware would be sorted and separated before washing since the salt solution may need to be washed off. However, depending on how the cafeteria is organized, the separating and sorting of the flatware may take place after washing.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In combination, a container, said container having a liquid solution therein, and flatware, said flatware designed to be quickly and easily sorted when placed in the liquid solution, said flatware comprising three classes, each of said three classes comprising spoons, forks and knives, said spoons having a generally uniform buoyancy so said spoons float at a first level in the liquid solution, said forks having a generally uniform buoyancy so said forks float at a second level in the liquid solution, and said knives having a generally uniform buoyancy so said knives float at a third level in the liquid solution, thereby providing separation of the spoons, forks and knives in different levels in the liquid solution, wherein said flatware has handles that are buoyant and each of said flatware further floats in a common position in the liquid solution and enabling the retrieval of the separated flatware in a sorted fashion.

2. The combination of claim 1, wherein said flatware is a material selected from the group consisting of: plastic, synthetic plastic, wood and metal.

3. The combination of claim 1, wherein said liquid solution is a liquid selected from the group consisting of: water and soapy water.

4. The combination of claim 1, wherein said flatware has handles that are buoyant and said flatware further floats in a vertical position in the liquid solution, thereby enabling the handles of the flatware to be sorted in one uniform direction.

5. The combination of claim 4, wherein the buoyancy of the spoons, forks and knives is different thereby enabling the separation of the spoons, forks and knives at three different levels in the liquid solution.

6. The combination of claim 4, wherein said flatware has air pockets sealed inside each handle defining a sealed hollow portion, thereby enabling the flatware to float in the liquid solution.

7. The combination of claim 4, wherein said handles have a floatation attached thereto, thereby enabling the flatware to float in the liquid solution.

8. The combination of claim 1, wherein one class of said flatware floats at a top surface portion in the liquid solution, a second class of said flatware floats at a bottom portion in the liquid solution in such a manner so that the second class of flatware stands on one end in a vertical position, and a third class of said flatware lies flat at a bottom portion in the liquid solution.

9. The combination of claim 8, wherein a prescribed amount of salt is mixed into liquid solution, said salt acting to change the specific gravity in the liquid solution, said prescribed amount of salt being sufficient to enable said second class of said flatware to float from the bottom portion in the liquid solution to the top surface portion in the liquid solution and also being sufficient to enable said third class of said flatware to stand on one end in the vertical position at the bottom portion in the liquid solution.

10. The combination of claim 8, wherein said first class of said flatware are spoons, said second class of said flatware are forks and said third class of said flatware are knives.

11. A method of sorting flatware in a liquid solution, said flatware comprising three classes, each of said three classes comprising spoons, forks and knives, each of said three classes further having a varying buoyancy so as to float at three different levels in the liquid solution, wherein said flatware has handles that are buoyant and each of said flatware further floats in a common position in the liquid solution, the method comprising:

placing said flatware in the liquid solution;

removing the first class of said flatware at the first level in the liquid solution;

removing the second class of said flatware at the second level in the liquid solution; and removing a third class of said flatware at a third level in the liquid solution.

12. The method of claim 11, wherein said flatware is a material selected from the group consisting of: plastic, synthetic plastic, wood and metal.

13. The method of claim 11, wherein said liquid solution is a liquid selected from the group consisting of: water and soapy water.

14. The method of claim 11, wherein said flatware has handles that are buoyant and said flatware further floats in a vertical position in the liquid solution, thereby enabling the handles of the flatware to be sorted in one uniform direction.

15. The method of claim 14, wherein the buoyancy of the spoons, forks and knives is different thereby enabling the separation of the spoons, forks and knives at three different levels in the liquid solution.

16. The method of claim 14, wherein said flatware has air pockets sealed inside each handle defining a sealed hollow portion, thereby enabling the flatware to float in the liquid solution.

17. The method of claim 14, wherein said handles have a floatation attached thereto, thereby enabling the flatware to float in the liquid solution.

18. The method of claim 11, wherein one class of said flatware floats at a top surface portion in the liquid solution, a second class of said flatware floats at a bottom portion in the liquid solution in such a manner so that the second class of flatware stands on one end in a vertical position, and a third class of said flatware lies flat at a bottom portion in the liquid solution.

19. The method of claim 18, wherein a prescribed amount of salt is mixed into liquid solution after said first class of flatware is removed from the liquid solution, said salt acting to change the specific gravity in the liquid solution, said prescribed amount of salt being sufficient to enable said second class of said flatware to float from the bottom portion in the liquid solution to the top surface portion in the liquid solution and also being sufficient to enable said third class of said flatware to stand on one end in the vertical position at the bottom portion in the liquid solution.

* * * * *